Aug. 27, 1968    G. D. HAYNIE    3,399,343
AUTOMATIC FILTER SELECTION CIRCUIT FOR
A TRANSMISSION MEASURING TEST SET
Filed Dec. 27, 1965    3 Sheets-Sheet 1

INVENTOR
G. D. HAYNIE
BY
John K. Mullarney
ATTORNEY

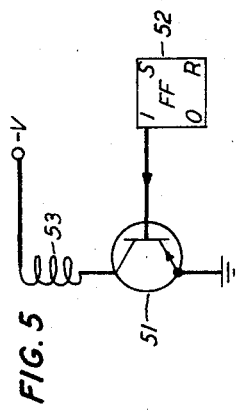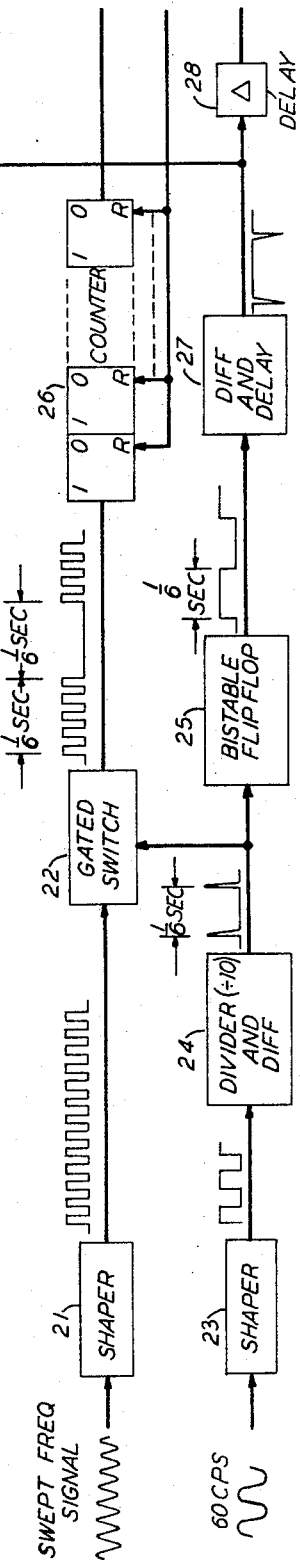

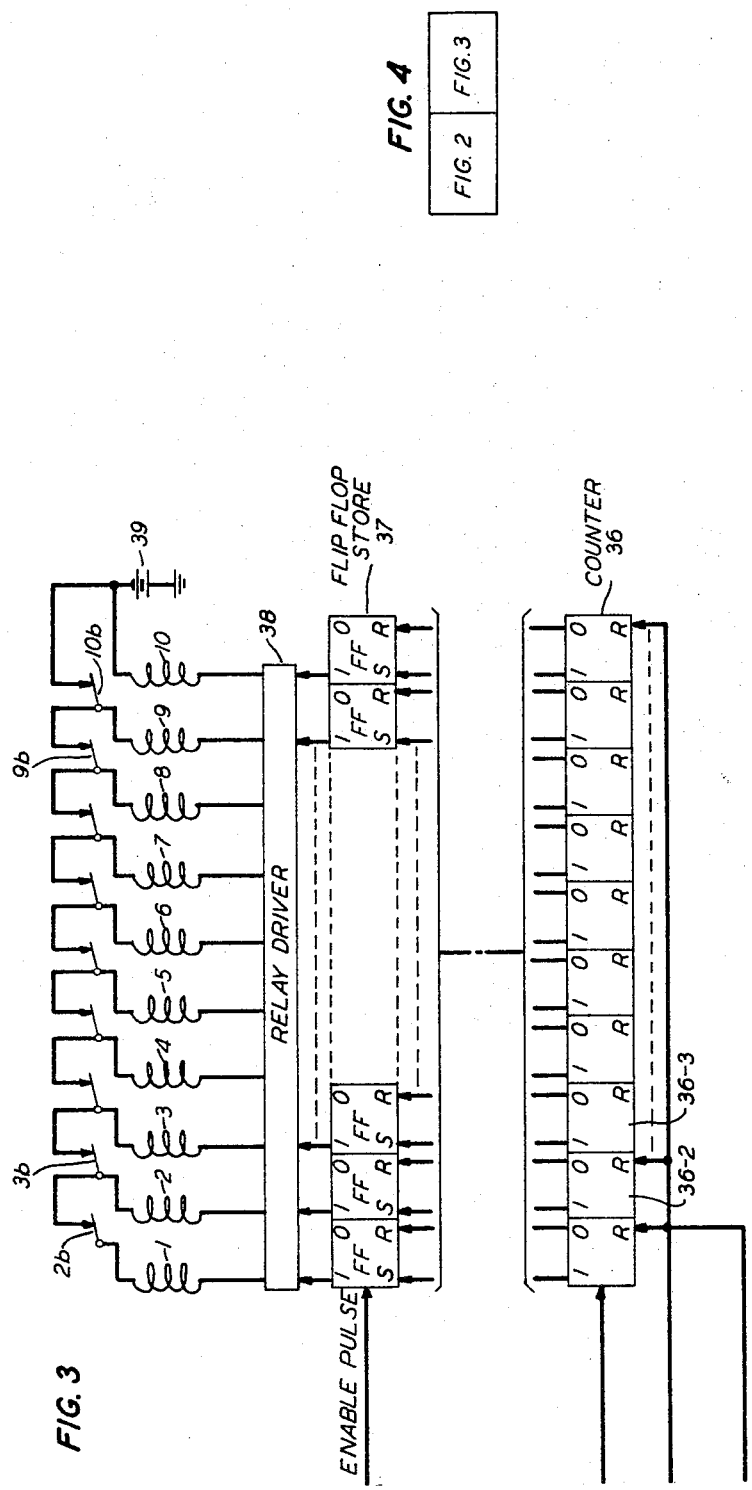

United States Patent Office 3,399,343
Patented Aug. 27, 1968

3,399,343
AUTOMATIC FILTER SELECTION CIRCUIT FOR A TRANSMISSION MEASURING TEST SET
Gerald D. Haynie, Berkeley Heights, N.J., assignor to Bell Telephone Laboratories, Incorporated, New York, N.Y., a corporation of New York
Filed Dec. 27, 1965, Ser. No. 516,378
6 Claims. (Cl. 324—57)

This invention relates to the art of electrical measuring and in particular to apparatus for controlling the automatic switching of the proper filter from a group of interrelated filters into a transmission path for the purpose of eliminating the harmonics of the instantaneous test frequency.

A common manner of measuring the transmission characteristics of a transmission network is to apply a swept frequency signal to the input of said network and subsequently detect the output derived therefrom. Such a measurement will provide, for example, an indication of the gain, or, conversely, the loss, of the network over the frequency band of interest (i.e., over the swept frequency range).

In the above-noted transmission measurement arrangement, any harmonics of the test frequency are a potential source of measurement error. For example, the second and third, or third and fourth, harmonics will intermodulate to produce a signal that is indistinguishable from the original instantaneous fundamental frequency. These undesirable harmonics are developed in the signal source generator itself and/or in the network under test, the latter generally having some degree of inherent non-linearity. Accordingly, the use of filters to eliminate the aforementioned potential source of measurement error is widely resorted to.

Usually a bank of frequency related filters is interposed between the transmission network under test and the detection circuit. Now as the test frequency is swept, often manually, over the frequency band of interest, the filters are manually and successively inserted into and then removed from the transmission path. This method of filter insertion and removal, of course, just adds to the task of the already overburdened test operator and, in addition, it incorporates into the measurements the factors of human fallibility. Further, it is usually too slow a method, particularly if the test frequency is being swept electronically.

There are analog type circuits for controlling the aforementioned filter insertion and removal; these usually incorporate some sort of tuned circuitry. Such arrangements, however, are not without their own inherent disadvantages, such as alignment difficulties and the errors resulting from misalignment, drift in the analog elements themselves, drift in the levels of threshold detection, et cetera.

It is an object of the present invention therefore to eliminate from swept frequency transmission measurements the source of error attributable to the harmonics of the instantaneous fundamental frequency.

A further object of the invention is to provide control for the automatic switching of the proper filter from a group of interrelated filters into a transmission path.

These objects are attained in accordance with a preferred embodiment of the present invention wherein the correct filter at any frequency is automatically chosen by a filter selector which operates relays to insert the filter in the transmission path. Each filter is used for one octave of the frequency range and the control is thereby readily carried out using a binary frequency counter. The binary counter is utilized to measure the instantaneous fundamental frequency of the test signal source and therefore there is a one-to-one (1:1) relationship between the highest counter stage activated during a count and the proper filter to be switched in.

In the preferred embodiment of the invention the swept frequency test signal is shaped and sampled, and the samples delivered to the input of the aforementioned binary counter, which then proceeds to count for a fixed period the number of pulses in the sample. Now since a group of successive octave range filters are binarily related (i.e., in frequency), an exact correspondence can be readily established bewteen the highest binary counter stage activated during a given period and the proper filter to be switched in. The highest stage activated during a count serves to energize a relay which then inserts the proper filter into the transmission path. The relays and their contacts are so wired that only the relay corresponding to the highest test frequency that is counted will be energized i.e., when a higher octave filter is switched into the transmission path the previously inserted filter is removed. After the appropriate relay has been energized the binary counter is reset and a new count begins. The swept frequency signal is sampled at a rate substantially greater than the sweep rate.

The various features and advantages of the invention will be better understood by a consideration of the following detailed description when read in connection with the accompanying drawing in which:

FIG. 1 is a schematic block diagram of a typical transmission measurement test set-up;

FIGS. 2 and 3, when arranged as shown in FIG. 4, show a schematic diagram of a filter selector circuit in accordance with the present invention;

FIG. 5 is a schematic diagram of a typical relay driver circuit; and

Figure 1:
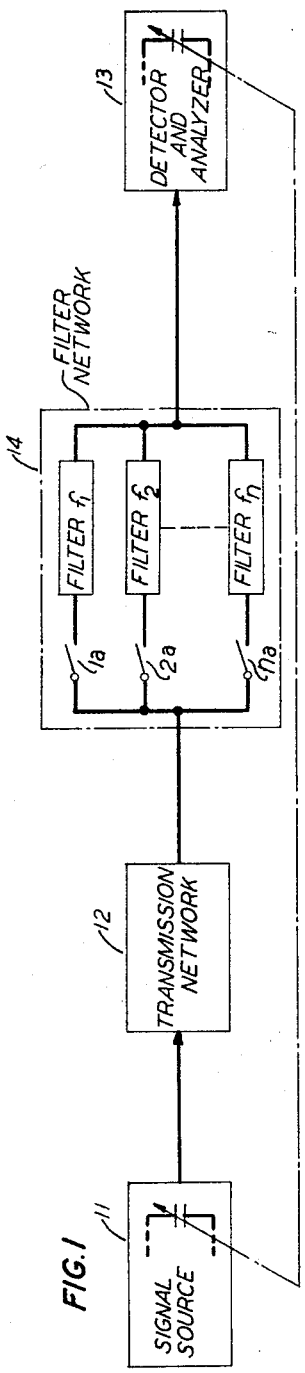

Turning now to FIG. 1 of the drawings, there is shown therein a typical transmission measurement arrangement which comprises a swept frequency signal source 11, a transmission network 12, under test, and a detector and analyzer 13. The signal source 11 has a variable tuning element such as a variable capacitor for sweeping the frequency of the source over the frequency band of interest. The transmission network 12 may comprise any network or transmission medium whose transmission characteristics are to be investigated. Such a network or medium can comprise a transmission line, coaxial or otherwise, a bridge circuit, an amplifier, filter, et cetera. The detector and analyzer 13 detects the output signal from the network 12 and provides an indication of a particular characteristic of the network, such as its gain or loss over the range of interest. To this end, the tuning element of the detector (e.g. a capacitor) is "ganged" to the tuning element of the source 11. In this manner, a measure of the effect of the network 12 on the swept fundamental frequency can be obtained. There are numerous systems in the art that measure transmission characteristics in this fashion.

Now, as indicated hereinbefore, harmonics are usually, and unfortunately, also generated by the signal source itself and/or they are developed as a result of the non-linearity of the network under test or the transmission path, especially if the latter is of great length. To this end a filter bank or network 14 is generally inserted in the transmission path proximate to the detector 13. It is the purpose of the present invention to automatically switch the individual filters of such a network 14 into the transmission path so as to readily overcome the deleterious effects created by the aforementioned harmonics.

A filter selection circuit in accordance with the invention is illustrated in FIGS. 2 and 3 of the drawings. The swept frequency signal generated by signal source 11 is applied to the input of the shaper 21. The shaper 21 amplifies and clips the input signal in a conventional manner so as to convert the same to a pulse type waveform, the periodicity of the latter corresponding to the frequency of the input signal. The pulse train output of the shaper 21 is then delivered to the gated switch 22 where a selected sample of the same is periodically taken.

In a similar manner a 60 cycle per second signal is applied to the shaper 23 wherein the same is converted to a square wave as illustrated in the drawing. This square wave is then delivered to the divider and differentiator circuit 24. The divider divides the input waveform by ten, for example; the latter is then differentiated in a conventional manner; and finally, the negative going differentiation spikes are clipped. The resultant output, therefore, comprises the positive going spikes which as a result of the divider operation are spaced apart ⅙ second. It is these positive going spike pulses that control the gating operation in the gated switch 22.

The switch 22 may comprise any conventional type of triggered bistable gate circuit which, in response to successive input positive going trigger pulses from circuit 24, successively alters its state of transmission. Thus, in response to a first trigger pulse the gate serves to pass the pulse train from shaper (i.e., the gate is open); the next trigger pulse closes the gate and hence blocks the transmission therethrough the pulse train; the next trigger pulse once again opens the gate, and so on. Thus as depicted in FIG. 2, the output of switch 22 comprises a ⅙ second sample of pulses followed by a ⅙ second "blank" period, which in turn is followed by another sample, et cetera.

As a matter of convenience, a time base of ⅙ second (60 c.p.s.÷10) has been utilized to advantage. However, as will be more evident hereinafter, any time base (i.e., ¼, ⅕, ⅐, 1/20 sec.) may be employed herein, the choice being at the discretion of the circuit designer. All that is necessary in this regard is that the rate of sampling (Sampling rate=1 time base) be substantially higher than the sweep rate of the test signal.

The positive going trigger pulses from the divider and differentiator 24 are also delivered to the bistable flip-flop 25 which in response thereto successively alters its state. Accordingly, as indicated in the drawing, each bistable state of the flip-flop 24 is of ⅙ second duration. For reasons which will be more evident hereinafter, the positive portions of this latter waveform should be coincident with the sampling periods of switch 22 and the negative portions thus coincident with the blanking periods of the switch. To this end, the bistable circuitry of the switch 22 can be readily phase-locked with the flip-flop circuitry using conventional techniques. Alternatively, the output of the bistaple flip-flop 25 can be used directly to control the gating action of switch 22.

The sampled pulses from switch 22 are delivered to the input of a binary counting chain which, as shown in FIGS. 2 and 3, comprises counters 26 and 36. Since only the output signals from the stages of counter 36 are utilized, these stages have been illustrated as comprising a counter which is separate and distinct from the counter 26 made up of the preceding input counter stages. In practice, however, this counting chain comprises a single binary counter of $n$ stages, $n$ being determined in accordance with considerations to be set forth hereinafter.

The binary counting chain totals the series of test frequency pulses that are received from the gated switch 22 in a ⅙ second sampling period. This count as registered in the counter 36 is then transferred into the flip-flop store 37 during the ⅙ second blanking period following the sampling period. To accomplish this transfer and reset the counting chain for the next count, the waveform derived from flip-flop 25 is utilized in the following manner.

As will be recalled, the trailing edge of a square wave derived from flip-flop 25 marks the end of a sampling period. This square wave is delivered to the differentiator and delay circuit 27 wherein it is differentiated and the positive going spikes clipped. The negative going spikes, corresponding to the trailing edges of the input square wave, are delayed slightly and then delivered as enabling pulses to the flip-flop store 37. The short delay is to permit the stages of the counter 36 to arrive at a steady state condition prior to the read-in to the flip-flop store. The negative going spike pulses are also fed, through the short delay 28, to the reset terminals of the counter stages to reset the same to their "0" state preparatory to the next count. The added delay 28 insures that this reset does not take place until the read-in to the flip-flop store 37 has been carried out.

The flip-flop store 37 comprises a plurality of flip-flop stages equal in number to the number of stages of counter 36. The successive counter stages are respectively associated with (i.e., wired to) the successive flip-flop stages of store 37. Accordingly, when the flip-flop stages are enabled the state of each counter stage is read into its associated flip-flop stage. That is, if a counter stage has been set to its "1" state as a result of the counting operation, the associated flip-flop of store 37 will also be set to its "1" state. The read-in from the counter stages to the flip-flop storage stages is destructive and hence the flip-flops need not be reset after each read-in operation.

The (1) output leads of the flip-flop stages are respectively coupled to the relays 1 through 10 via the relay driver circuitry 38. Thus, if a single flip-flop stage has been set to its "1" state, the energized (1) output lead thereof will cause the relay associated therewith to be energized. The contacts $1a$, $2a$ . . . $na$ ($na$ is $10a$ in this case) of FIG. 1 are respectively associated with the relays 1–10 and thus when a given single relay is energized it will cause the associated filter $f_1$, $f_2$ . . . $f_n$ to be inserted into the transmission path. Thus, if relay 2 is energized in the manner described, the contacts $2a$ are closed and filter $f_2$ is inserted in the transmission path.

As shown in FIG. 3, further contacts are associated with the relays; the relays and these contacts are so wired that only the relay corresponding to the highest counter stage energized in a given count will be engaged. For example, assume that as a result of a test frequency count the stages 36–2 and 36–3 of the counter 36 have been set to their "1" state. This, one would expect, would cause the relays 2 and 3 to be energized or engaged. However, with the energization of relay 3 the contacts $3b$ are opened and the relay 2 is therefore disconnected from the energization source 39. Accordingly, only that relay corresponding to the highest test frequency count will be energized. As will be more evident hereinafter, the end result of this mode of operation is that when a higher frequency filter is switched into the transmission path the previously inserted, lower frequency filter is removed.

A typical relay driver circuit is shown in FIG. 5. Normally transistor 51 is cut off. However, when the typical flip-flop 52 of flip-flop store 37 is set to its "1" state it applies the proper bias to the base of the transistor causing the same to conduct and thereby provide a direct-current path to ground for the relay, via its collector-emitter path.

Figure 6:
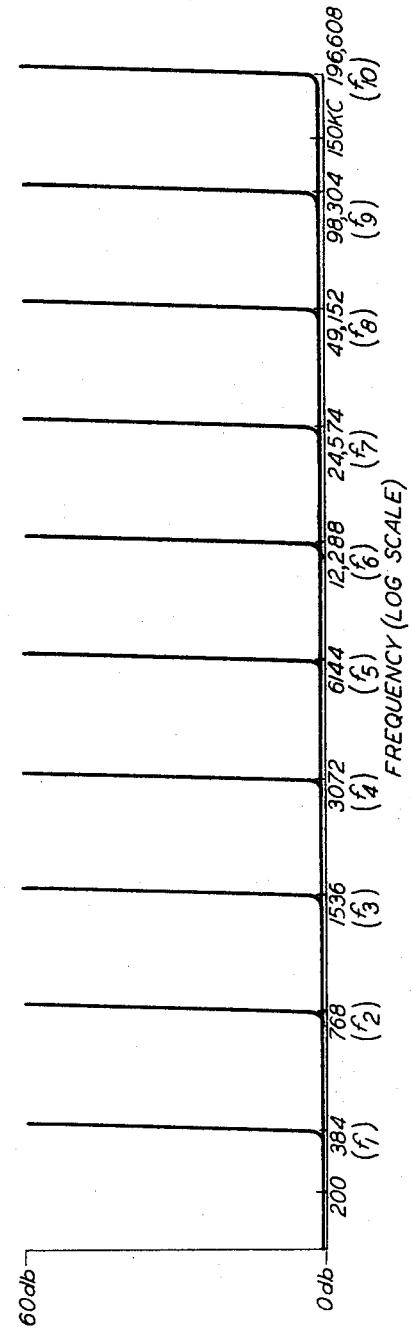
FIG. 6 is a plot of the bandpass characteristics of the filters utilized in accordance with the invention.

The theory of operation of the present invention will be more apparent by reference to FIG. 6 of the drawings which comprises a plot of the frequency pass characteristics of the filters utilized herein. A total of 10 filters is used to cover an assumed swept frequency range from 0.2–150 kc. Each filter is flat (±0.25 db) for a range of one octave. Beyond this range attenuation increases sharply to 60 db or more. Thus, the first low pass filter ($f_1$) is essentially flat to 384 c.p.s. with a sharp increase in attenuation (i.e., cut-off) thereafter. The next low pass filter ($f_2$) has a cut-off frequency one octave higher (i.e., 384×2 or 768 c.p.s.); the next filter ($f_3$) similarly has a cut-off frequency (1536 c.p.s.) one octave higher than the preceding filter ($f_2$); and so on.

The switching frequencies ($f_s$), i.e., the frequencies at which the respective filters are switched into the transmission path, are given by the following equation:

$$fs = \frac{2^n \pm 1}{t}$$

where $n$ is the highest counter stage that is set to its "1" state and $t$ is the time base. Thus, for the assumed time base of 1/6 second the equation reduces the following:

$$fs = \frac{2^n \pm 1}{\frac{1}{6}} = (6 \times 2^n) \pm 6 \text{ c.p.s.}$$

The ±6 c.p.s. in the basic equation represents the uncertainty in the switching frequency. This uncertainty is due to the fact that the 60 c.p.s. signal used to derive the sampling pulse is in no way phase locked to the swept frequency signal and hence the sample or "window" may possibly include one pulse more or one less than a normal sample. For the assumed time base of 1/6 sec., this uncertainty amounts to ±6 c.p.s. which is deemed reasonable for substantially all cases.

Disregarding for the moment the above-noted uncertainty, it will be apparent that the switching frequencies are binarily related to the highest counter stage activated during a given count in accordance with the equation $fs = 6 \times 2^n$. Thus, when the sixth stage of the counter chain is the highest stage activated, the switching frequency is 384 c.p.s. ($6 \times 2^6 = 6 \times 64 = 384$ c.p.s.). In terms of circuit operation, this means that when the test frequency signal is swept, from the initial frequency of 200 c.p.s., to 384 c.p.s., the sixth stage of the counter chain will be set to its "1" state. The counter chain comprises the counter stages of counters 26 and 36 and thus, in this instance, the sixth stage will be that labeled 36–2. With this stage set to its "1" state the relay 2 will be energized to thereby insert filter ($f_2$) into the transmission path. As the sweep of the test frequency continues, the seventh state of the counter chain will be set to its "1" state when the swept frequency reaches 768 c.p.s. ($768 = 6 \times 2^7$). The relay 3 will now be energized and filter ($f_3$) thus inserted into the transmission path. The filter ($f_2$) is now removed from the path because the relay 2 is disconnected from source 39 as heretofore described. In a similar manner the successive higher octave filters are inserted into the transmission path as the swept frequency signal reaches the switching frequencies defined by the above equation.

Since the sweep initially starts at 200 c.p.s. the fifth stage of the counter chain (i.e., the first stage of counter 36), is immediately set to its "1" state and the filter ($f_1$) is inserted into the transmission path until the swept frequency reaches the first filter switching frequency ($f_s$) of 384 c.p.s.

Now, as will be obvious to those skilled in the art, the described insertion of the octave range filters into the transmission path eliminates the heretofore described source of measurement error attributable to the harmonics of the swept fundamental frequency. For any given instantaneous value of fundamental frequency, the third and all higher order harmonics thereof will be completely eliminated by the filter then in the transmission path. This will be obvious from an examination of the curves of FIG. 6. Thus, the error attributable to the intermodulation of the second and third, or third and fourth, or fourth and fifth, harmonics is eliminated. The second harmonic of the swept fundamental frequency is also eliminated except at those instances where the fundamental frequency equals a switching frequency. For example, when the swept frequency reaches 384 c.p.s. the filter ($f_2$) is switched into the transmission path. At this instant, however, the frequency of the second harmonic is 768 c.p.s. and hence it is just at the cut-off point of filter ($f_2$). Accordingly, a small segment of the second harmonic will be passed by the filter ($f_2$). However, as the sweep of the fundamental frequency continues the second harmonic frequency will quickly exceed the filter ($f_2$) cut-off frequency and hence be attenuated. The third harmonic is always attenuated or cut off and therefore there can never be measurement error from the intermodulation of the second and third harmonics.

The number of filters to be used in a given arrangement is determined primarily by the frequency range of interest. This also will dictate the number of stages in the binary counting chain.

From the foregoing description it will be seen that a particularly advantageous feature of the present invention is the ready control that may be had of the nominal switching frequencies and the uncertainty in the same by varying the number of counter stages and the aforementioned time base.

While the present invention has been disclosed in the context of a test measuring arrangement, it will be clear that the same may be utilized in any situation where one wants a single tunable frequency and the presence of harmonics is objectionable. Further, while the disclosed filter frequency ranges have a binary progression or relationship, it will be apparent that the same may be interrelated in accordance with a different base number system, for example, the same might be ternarily related. In this case a ternary counter would be used in essentially the same manner as the described binary counter.

Accordingly, it is to be understood that the foregoing disclosure relates to only a preferred embodiment of the invention and numerous modifications and alterations may be made therein without departing from the spirit and the scope of the invention.

What is claimed is:

1. In a transmission measuring test arrangement wherein a swept frequency signal is applied to a test transmission network and the output therefrom is detected to provide a measure of the transmission characteristics of the network under test, the combination comprising a bank of octave range filters, switch means for respectively inserting each octave range filter into the transmission path between the network under test and the device detecting the output signal therefrom, means for sampling the instantaneous value of the swept frequency signal, binary counting means for measuring the value of the swept frequency signal sample, and means for activating said switch means to insert a given one of the bank of octave range filters into the transmission path in response to the highest test frequency that is counted by the binary counting means during a sampling period, the filter selected in each instance having an attenuation characteristic that effectively eliminates the third and all higher order harmonics of the instantaneous value of the swept frequency signal.

2. The combination as defined in accordance with claim 1 wherein the binary counting means comprises a plurality of cascaded stages, the frequencies at which successive octave range filters are inserted into the transmission path being defined by the equation $$f_s = \frac{2^n \pm 1}{t}$$

where $n$ is the highest counting stage activated during a given count and $t$ is the time base of the sampling period.

3. The combination as defined in claim 1 wherein the swept frequency signal is sampled at a rate substantially greater than the sweep rate.

4. The combination as defined in accordance with claim 3 including means permitting the activation of only that switch means corresponding to the highest test frequency that is counted in the binary counting means.

5. The combination as defined in accordance with claim 4 wherein the test frequency signal is swept from a low frequency to a very much higher frequency, the last-recited means serving to remove a lower octave filter from the transmission path when the next higher octave filter is inserted into the path.

6. A transmission measuring test set comprising a swept frequency signal source, means for coupling the swept frequency signal to the input of a transmission network under test, means for detecting the swept frequency signal at the output of said transmission network, a bank of successive octave range filters whose total frequency range is at least as great as the swept frequency range, switch means respectively associated with each filter for the purpose of inserting the same into the transmission path between the network under test and the detecting means, means for sampling the instantaneous value of the swept frequency signal, a binary counter, means coupling the swept frequency signal sample to said binary counter for establishing a count therein which corresponds to the instantaneous value of the sampled swept frequency and means for activating said switch means to insert a selected one of the bank of octave range filters into the transmission path in accordance with the highest counter stage activated during a count, the successive activation of higher counter stages serving to insert successively higher octave range filters into the transmission path.

References Cited
UNITED STATES PATENTS

| | | | |
|---|---|---|---|
| 3,038,119 | 6/1962 | Billig et al. | 324—57 |
| 3,311,714 | 3/1967 | Howson | 179—175.31 |

RUDOLPH V. ROLINEC, *Primary Examiner.*

E. E. KUBASIWEICZ, *Assistant Examiner.*